US010009695B2

(12) United States Patent
Guo (10) Patent No.: US 10,009,695 B2
(45) Date of Patent: *Jun. 26, 2018

(54) HEARING SYSTEM FOR ESTIMATING A FEEDBACK PATH OF A HEARING DEVICE

(71) Applicant: Oticon A/S, Smørum (DK)

(72) Inventor: Meng Guo, Smørum (DK)

(73) Assignee: OTICON A/S, Smorum (DK)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/438,182

(22) Filed: Feb. 21, 2017

(65) Prior Publication Data

US 2017/0164122 A1    Jun. 8, 2017

Related U.S. Application Data

(62) Division of application No. 14/922,893, filed on Oct. 26, 2015, now Pat. No. 9,615,184.

(30) Foreign Application Priority Data

Oct. 28, 2014  (EP) .................................. 14190683.4

(51) Int. Cl.
*H04R 25/00* (2006.01)
*G06F 3/16* (2006.01)

(52) U.S. Cl.
CPC ......... *H04R 25/453* (2013.01); *H04R 25/558* (2013.01); *G06F 3/165* (2013.01); *H04R 25/554* (2013.01)

(58) Field of Classification Search
CPC .... H04R 25/70; H04R 25/554; H04R 25/558; H04R 2225/55

See application file for complete search history.

(56) References Cited

U.S. PATENT DOCUMENTS 6,035,050 A    3/2000  Weinfurtner et al.
7,853,028 B2   12/2010 Fischer
(Continued)

FOREIGN PATENT DOCUMENTS

EP    2391145 A1    11/2011
EP    2613566 A1     7/2013
WO  WO 2008/151970 A1  12/2008

OTHER PUBLICATIONS

Woodruff et al., "Fixed filter implementation of feedback cancellation for in-the-ear hearing aids", Applications of Signal Processing to Audio and Acoustics, 1995, IEEE ASSP Workshop on New Paltz, New York, NY, USA, Oct. 15-18, 1995, pp. 22-23.

*Primary Examiner* — Brenda C Bernardi
(74) *Attorney, Agent, or Firm* — Birch, Stewart, Kolasch & Birch, LLP (57) ABSTRACT

A hearing system comprises a programming device comprising a) a feedback path analyzer for providing an estimate of a feedback path from an output transducer to an input transducer of a hearing device, and b) a programming interface allowing the exchange of data between the programming device and the hearing device. The programming device is configured to receive corresponding input and output time segments of an electric input signal and of a processed output signal, respectively, of the hearing device, via the programming interface, and the feedback path analyzer is configured to determine the estimate of the feedback path based on the input and output time segments. The invention may e.g. be used for the fitting of hearing devices, e.g. hearing aids, to a particular use or user.

21 Claims, 4 Drawing Sheets

(56) References Cited

U.S. PATENT DOCUMENTS

| | | |
|---|---|---|
| 8,280,088 B2 | 10/2012 | Kornagel |
| 8,538,049 B2 | 9/2013 | Apfel et al. |
| 8,538,052 B2 | 9/2013 | Elmedyb et al. |
| 8,611,570 B2 | 12/2013 | Neumeyer et al. |
| 8,761,421 B2 | 6/2014 | Apfel |
| 8,792,661 B2 | 7/2014 | Apfel et al. |
| 2011/0293124 A1 | 12/2011 | Ma |
| 2013/0170660 A1 | 7/2013 | Kristensen et al. |
| 2013/0266164 A1 | 10/2013 | Woods |
| 2013/0294610 A1 | 11/2013 | Munk |

HEARING SYSTEM FOR ESTIMATING A FEEDBACK PATH OF A HEARING DEVICE

This application is a Divisional of co-pending application Ser. No. 14/922,893, filed on Oct. 26, 2015, which claims the benefit of Patent Application No. EP 14190683.4, filed in Europe on Oct. 26, 2014. The entire contents of which are hereby incorporated by reference into the present application.

TECHNICAL FIELD

The present application relates to hearing devices. The disclosure relates specifically to a hearing system comprising a hearing device, and a programming device for running fitting software (or a part thereof) allowing signal processing of the hearing device to be adapted, e.g. to a particular user and/or application, via a common programming interface.

Embodiments of the disclosure may e.g. be useful in applications such as fitting of hearing devices, e.g. hearing aids, to a particular use or user.

BACKGROUND

During fitting of a hearing aid to a particular user's needs, a feedback measurement is typically performed by using a feedback cancellation system of the hearing aid configured in a specific 'fitting-mode'. A limitation of this procedure is that the feedback cancellation system in hearing aids is implemented in a specific way (adapted to its normal use in the hearing aid). In practice, such procedure offers only limited estimation accuracy, and typically a lengthy measurement time is required.

SUMMARY

An object of the present application is to provide an alternative scheme for estimating a feedback path of a hearing device.

The present disclosure proposes a scheme for feedback path estimation from an output transducer to an input transducer of a hearing device wherein digital loudspeaker and microphone data signals are buffered (temporarily stored) in the hearing device and transmitted (by wire or wirelessly) to a programming device for running a fitting software for programming (fitting) the hearing device to a particular user's needs and/or to a particular application. Subsequently, in the programming device, an (off-line) estimation of the feedback path is performed based on the received digital loudspeaker and microphone data signals.

Objects of the application are achieved by the invention described in the accompanying claims and as described in the following.

A Hearing System:

In an aspect of the present application, an object of the application is achieved by a hearing system comprising
  a hearing device (HD), the hearing device comprising
    an input transducer (IT) for converting an input sound to an electric input signal, and
    an output transducer (OT) for converting a processed electric signal to an output sound,
    a forward path between the input transducer and the output transducer, the forward path comprising a signal processing unit (SPU) for applying a level and/or frequency dependent gain to a signal of the forward path and providing a processed output signal,
  a programming device (PD),
  a feedback path analyzer (FPA) for providing an estimate of a feedback path from the output transducer to the input transducer,
  the hearing device (HD) and the programming device (PD) each comprising a programming interface (PI, PD-PI) allowing the exchange of data between the devices. The hearing system is configured to provide that the feedback path analyzer (FPA) is located in the programming device (PD), and
    the hearing device (HD) comprises respective input (IBUF) and output (OBUF) buffers for storing corresponding input and output time segments of the electric input signal or a signal derived therefrom and of the processed output signal or a signal derived therefrom, respectively, and wherein
    the hearing device (HD)—in a specific feedback measurement mode—is configured to transmit said stored input and output time segments of the respective signals to the feedback path analyzer (FPA) of the programming device (PD) via said programming interface (PI, PD-PI), and wherein
    the feedback path analyzer (FPA) in said specific feedback measurement mode—is configured to determine said estimate of the feedback path based on said input and output time segments.

Thereby a more accurate estimation and a shorter measurement time can be achieved.

In an embodiment, the hearing device comprises an analogue to digital converter for converting an analogue electric signal to a digital electric signal comprising digital samples. In an embodiment, the hearing device comprises a digital to analogue converter for converting a digital electric signal comprising digital samples to an analogue electric signal. In an embodiment, an analogue electric signal representing an acoustic signal is converted to a digital audio signal in an analogue-to-digital (AD) conversion process, where the analogue signal is sampled with a predefined sampling frequency or rate $f_s$. In an embodiment, $f_s$ is in the range from 8 kHz to 40 kHz (e.g. adapted to the particular needs of the application in question) to provide digital samples $x_n$ (or x[n]) at discrete points in time $t_n$ (or n). Each audio sample represents the value of the acoustic signal at time $t_n$ by a predefined number $N_s$ of bits, $N_s$ being e.g. in the range from 1 to 16 bits. A digital sample x has a length in time of $1/f_s$, e.g. 50 µs, for $f_s$=20 kHz. In an embodiment, a number of audio samples are arranged in a time frame. In an embodiment, a time frame comprises 64 audio data samples. Other frame lengths may be used depending on the practical application.

In an embodiment, the hearing device and the programming device each comprises respective antenna and transceiver circuitry for wirelessly receiving a direct electric input signal from another device to implement said programming interface. In an embodiment, the programming interface is or comprises a (possibly standardized) electric interface (e.g. in the form of a wired connector or a wireless interface) for receiving a direct electric input signal from the other device. In an embodiment, the direct electric input signal represents or comprises audio data and/or a control data and/or information data and/or programming parameters and/or a software/firmware program or a part thereof. In an embodiment, the programming interface comprises a wireless link. In general, the wireless link established by the antenna and transceiver circuitry of the respective devices can be of any type.

Preferably, communication between the hearing device and the programming device is based on some sort of modulation at frequencies above 100 kHz. Preferably, frequencies used to establish a communication link between the hearing device and the other device is below 50 GHz, e.g. located in a range from 50 MHz to 50 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the input and output buffers are configured to store more than 50 audio samples. In an embodiment, the input and output buffers are configured to store more than 100 audio samples, such as more than 500 audio samples. In an embodiment, the input and output buffers are configured to store one or more frames of audio samples, e.g. two or more frames, such as five or more frames. In an embodiment, the input and output buffers are configured to store less than 1000 audio samples. In an embodiment, the input and output buffers are configured to store between 1 and 20 frames of audio samples, e.g. between 2 and 10 frames. In an embodiment, the input and output buffers are cyclic buffers so that relatively older samples are replaced by relatively newer samples. In an embodiment, the contents of the buffers are transmitted to the programming device, when a given buffer comprises a predetermined number $N_{new}$ of new samples since the last transmission, e.g. $N_{new}=1$ or equal to the length in samples of the buffer, or equal to a frame length (or more than one frame) of the input or output signal, e.g. equal to 32 or 64 samples.

In an embodiment, the feedback path analyzer is configured to apply an LMS-type algorithm for providing an estimate of the feedback path. In an embodiment, the hearing system comprises a number of different types of algorithms, selectable for use by the feedback path analyzer to provide an estimate of the feedback path. In an embodiment, the hearing system (e.g. the programming device, e.g. the feedback control unit) comprises a number of different types algorithms (each being e.g. optimized for a specific acoustic situation), selectable for use by the feedback path analyzer to provide an estimate of the feedback path. In an embodiment, the selection (or proposal) of the type of algorithm to be used in a specific situation is performed manually via a user interface or automatically according to a specific (e.g. prevailing) acoustic situation.

In an embodiment, the hearing system comprises a feedback control unit for controlling the feedback path analyzer. In an embodiment, the feedback control unit comprises a cross-correlation estimator for estimating the cross-correlation between the electric input signal or a signal derived therefrom and the processed output signal or a signal derived therefrom. In an embodiment, the feedback control unit comprises an auto-correlation estimator for estimating the auto-correlation of a signal of the forward path, e.g. of the electric input signal or a signal derived therefrom or of the processed output signal or a signal derived therefrom. In an embodiment, the feedback control unit comprises a background noise estimator for providing an estimate of the current (background) noise level (or power or energy).

In an embodiment, the hearing system comprises a probe signal generator configured to provide a probe signal. In an embodiment, the probe signal generator is configurable, e.g. allowing different probe signals to be generated and applied to the output transducer of the hearing device. In an embodiment, the probe signal generator is configured to use a (cyclically repeated) deterministic sequence with perfect or near perfect autocorrelation as a probe signal (in certain situations). The term 'deterministic' is used as opposed to 'stochastic' or 'random' (the latter being e.g. exemplified in a probe signal comprising white noise). In an embodiment, the probe signal generator is configured to use a 'stochastic' or 'random' sequence. In an embodiment, the probe signal generator is located in the hearing device. In an embodiment, the probe signal generator is located in the programming device. In an embodiment, the probe signal generator is located partly in the hearing device, and partly in the programming device.

In an embodiment, the hearing system (e.g. the hearing device) comprises a combination unit configured to allow the probe signal to be coupled to the output transducer. In an embodiment, the hearing system is configured (in a specific feedback estimation mode) to control the combination unit to allow the (or a) probe signal to be coupled to the output transducer alone. In an embodiment, the hearing system is configured to control the combination unit to allow the probe signal (or a signal derived therefrom) to be coupled to the output transducer together with the processed output signal from the signal processing unit. In an embodiment, the probe signal is generated in the programming device. In an embodiment, the probe signal is generated in the hearing device, In an embodiment, the hearing system comprises a user interface allowing a user (e.g. an audiologist and/or a user of the hearing device) to initiate an estimation of the feedback path based on said input and output time segments. In an embodiment, the programming device comprises the user interface. In an embodiment, the user interface is implemented in a (possibly third) separate device, e.g. a remote control of the hearing system, e.g. a cellular telephone, such as a SmartPhone, or a similar device. In an embodiment, the programming device is implemented in a computer, e.g. PC, such as a laptop or tablet computer. In an embodiment, the programming device is configured to (in a normal mode of operation) receive power from a mains power supply (line power, e.g. from a wall socket). In an embodiment, the programming device is configured to be a stationary device. In an embodiment, the user interface is implemented in a portable device, e.g. as an APP of a SmartPhone or similar device.

In an embodiment, the stored input and output time segments of the respective signals are transmitted sample by sample from the hearing device to the programming device (e.g. according to a standardized (e.g. G.722) or proprietary scheme). In an embodiment, the input and output time segments of the respective signals are arranged in frames of data samples in the input and output buffers, respectively, and transmitted frame by frame from the hearing device to the programming device (e.g. according to a standardized (e.g. an audio codec compatible with Bluetooth or Bluetooth Low energy) or proprietary scheme).

In an embodiment, the hearing system is configured to automatically select an appropriate of said number of different types of algorithms based on a predetermined criterion. In an embodiment, a criterion for selecting an appropriate algorithm is based on (or influenced by) the inputs from one or more detectors, e.g. an estimate of the background noise level (or power or energy). In an embodiment, where the background noise level (or power or energy) is relatively low, an adaptive feedback path estimation algorithm using a probe signal comprising a cyclically repeated perfect sequence is applied. In an embodiment, where the background noise level (or power or energy) is relatively high, an adaptive feedback path estimation algorithm using a sine sweep method or a deterministic method with matrix inversion is applied.

The system (e.g. the hearing device) comprises a memory (one or more buffers) for recording (storing) audio data from the forward path of the hearing device. In an embodiment, the system is configured to store audio data picked up by the microphone. In an embodiment, the system is configured to store audio data delivered to the output transducer for being presented to a user. In an embodiment, the system is configured to store corresponding time segments (e.g. a pre-defined number of audio samples) of audio data picked up by the microphone and audio data delivered to the output transducer (e.g. recorded simultaneously). In an embodiment, the system is configured to store the audio data in the hearing device. In an embodiment, the system is configured to transmit (by wire or wirelessly) the audio data to the programming device. In an embodiment, the system (e.g. the programming device) is configured to perform an offline estimation of the feedback path based on the recorded (stored) audio data. This may have the advantage of providing a more accurate estimation and a shorter measurement time. These advantages are achievable, because of two things:
1. The programming device (computer) is typically (if not always) more computationally powerful than a hearing device, and one can perform more advanced estimations more quickly.
2. The offline estimation is independent on the implemented feedback cancellation system in hearing devices, and one can e.g. choose the most optimal estimation method given the measurement environment.

In an embodiment, the hearing device is adapted to provide a frequency dependent gain and/or a level dependent compression and/or a transposition (with or without frequency compression) of one or frequency ranges to one or more other frequency ranges, e.g. to compensate for a hearing impairment of a user. In an embodiment, the hearing device comprises a signal processing unit for enhancing the input signals and providing a processed output signal.

In an embodiment, the output transducer is adapted for providing a stimulus perceived by the user as an acoustic signal based on a processed electric signal. In an embodiment, the output transducer comprises a receiver (loudspeaker) for providing the stimulus as an acoustic signal to the user. In an embodiment, the output transducer comprises a vibrator for providing the stimulus as mechanical vibration of a skull bone to the user (e.g. in a bone-attached or bone-anchored hearing device).

In an embodiment, the hearing device is a portable device, e.g. a device comprising a local energy source, e.g. a battery, e.g. a rechargeable battery. In an embodiment, the hearing device has a maximum outer dimension of the order of 0.15 m (e.g. a handheld mobile telephone). In an embodiment, the hearing device has a maximum outer dimension of the order of 0.08 m (e.g. a head set). In an embodiment, the hearing device has a maximum outer dimension of the order of 0.04 m (e.g. a hearing instrument).

In an embodiment, the hearing devices comprise an analogue-to-digital (AD) converter to digitize an analogue input (e.g. from the input transducer) with a predefined sampling rate, e.g. 20 kHz. In an embodiment, the hearing devices comprise a digital-to-analogue (DA) converter to convert a digital signal to an analogue output signal, e.g. for being presented to a user via the output transducer.

In an embodiment, the hearing device comprise(s) a TF-conversion unit for providing a time-frequency representation of an input signal. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz.

In an embodiment, the hearing device comprises a classification unit for classifying a current acoustic environment around the hearing device (e.g. related to feedback). In an embodiment, the hearing device comprises a number of detectors (e.g. a feedback detector, such as a correlation detector) providing inputs to the classification unit and on which the classification is based.

In an embodiment, the hearing system comprises a level detector (LD) for determining the level of an input signal (e.g. on a band level and/or of the full (wide band) signal). The input level of the electric input signal picked up from a user's acoustic environment is e.g. a classifier of the environment.

In an embodiment, the hearing system comprises a noise level detector for estimating a current noise level (or power or energy).

In an embodiment, the hearing system comprises a voice detector (VD) for determining whether or not an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only comprising other sound sources (e.g. artificially generated noise).

In an embodiment, the hearing device comprises an acoustic (and/or mechanical) feedback suppression system, e.g. an adaptive feedback cancellation system. In an embodiment, the adaptive feedback cancellation system is based on a linear time invariant filter to estimate the feedback path wherein the filter weights are updated over time, e.g. using a stochastic gradient algorithm, including some a Least Mean Square (LMS) or Normalized LMS (NLMS) algorithm.

In an embodiment, the hearing device further comprises other relevant functionality for the application in question, e.g. compression, noise reduction, etc.

In an embodiment, the hearing device comprises a listening device, e.g. a hearing aid, e.g. a hearing instrument, e.g. a hearing instrument adapted for being located at the ear or fully or partially in the ear canal of a user or fully or partially implanted in the head of a user, or a headset, or an earphone, or an ear protection device or a combination thereof.

A Hearing Device:

In an aspect, a hearing device is provided. The hearing aid comprises
   an input transducer for converting an input sound to an electric input signal, and
   an output transducer for converting a processed electric signal to an output sound,
   a forward path between the input transducer and the output transducer, the forward path comprising a signal processing unit (SPU) for applying a level and/or frequency dependent gain to a signal of the forward path and providing a processed output signal, a programming interface allowing the exchange of data between the hearing device and a programming device comprising a feedback path analyzer for providing an estimate of a feedback path from the output transducer to the input transducer, an input buffer and an output buffer for storing corresponding input and output time segments of the electric input signal or a signal derived therefrom and of the processed output signal or a signal derived therefrom, respectively, and wherein the hearing device—in a specific feedback measurement mode—is configured to transmit said stored input and output time segments of the respective signals to the feedback path analyzer of the programming device via said programming interface, and to receive said estimate of the feedback path based on said input and output time segments from said feedback path analyzer of the programming device via said programming interface.

In an embodiment, the estimate of the feedback path based on said input and output time segments is stored and used in the hearing device instead of a previous feedback path estimate.

Use:

In an aspect, use of a hearing device as described above, in the 'detailed description of embodiments' and in the claims, is moreover provided.

Definitions:

In the present context, a 'hearing device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear.

The hearing device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing device may comprise a single unit or several units communicating electronically with each other.

More generally, a hearing device comprises an input transducer for receiving an acoustic signal from a user's surroundings and providing a corresponding input audio signal and/or a receiver for electronically (i.e. wired or wirelessly) receiving an input audio signal, a signal processing circuit for processing the input audio signal and an output means for providing an audible signal to the user in dependence on the processed audio signal. In some hearing devices, an amplifier may constitute the signal processing circuit. In some hearing devices, the output means may comprise an output transducer, such as e.g. a loudspeaker for providing an air-borne acoustic signal or a vibrator for providing a structure-borne or liquid-borne acoustic signal.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window.

A 'hearing system' refers to a system comprising one or two hearing devices, and a 'binaural hearing system' refers to a system comprising one or two hearing devices and being adapted to cooperatively provide audible signals to both of the user's ears. Hearing systems or binaural hearing systems may further comprise 'auxiliary devices', which communicate with the hearing devices and affect and/or benefit from the function of the hearing devices. Auxiliary devices may be e.g. remote controls, audio gateway devices, mobile phones (e.g. SmartPhones), public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

It is possible to use a state-of-the-art hearing device (HD) to estimate the feedback path without transmitting the data to a programming device (PD), which is typically a computer (PC, MAC etc.) or SmartPhone used for the hearing aid fitting. However, due to the limited processing power in a hearing device, only relatively simple algorithms are implemented to estimate feedback paths, such as a simple adaptive least-mean-square algorithms. Moreover, the feedback path estimation can only be performed using the implemented algorithm. Hence, there are only limited options to obtain a precise estimation within a short time period. On the other hand, with the access of input/output data samples in a much more computationally powerful programming device, the feedback path estimation is no more limited to the simple estimation algorithm that is implemented in the hearing device. With the access of all data, one can use more technically advanced and computationally demanding approaches to determine the feedback path, e.g., a matrix inversion method by multiplying the inverse of the auto-correlation matrix of the output signal to the cross-correlation vector of the input and output signal, or a logarithmic sine sweep technique which requires reversing and convolution of the obtained input/output data samples with a compensation of the magnitude spectrum of the resulting impulse response. These methods are not suitable for state-of-the-art hearing aids due to the computational complexity.

Furthermore, a programming device in an off-line processing step—can have many optional estimation methods, and be configured to allow a user (or the programming device) to choose the best suitable one in terms of precision, robustness, and measurement time, in different situations (e.g. in different acoustic situations or in different hearing devices (e.g. depending on their design).

It is expected that the feedback path measurement time can thereby be significantly reduced, e.g. more than a factor of 5-10 compared to present day hearing devices, e.g. to less than 2 seconds. Another advantage of the scheme is that there is no need to redesign the feedback analyzer (FPA) when a new IC-platform for the hearing device is introduced.

Figure 1:
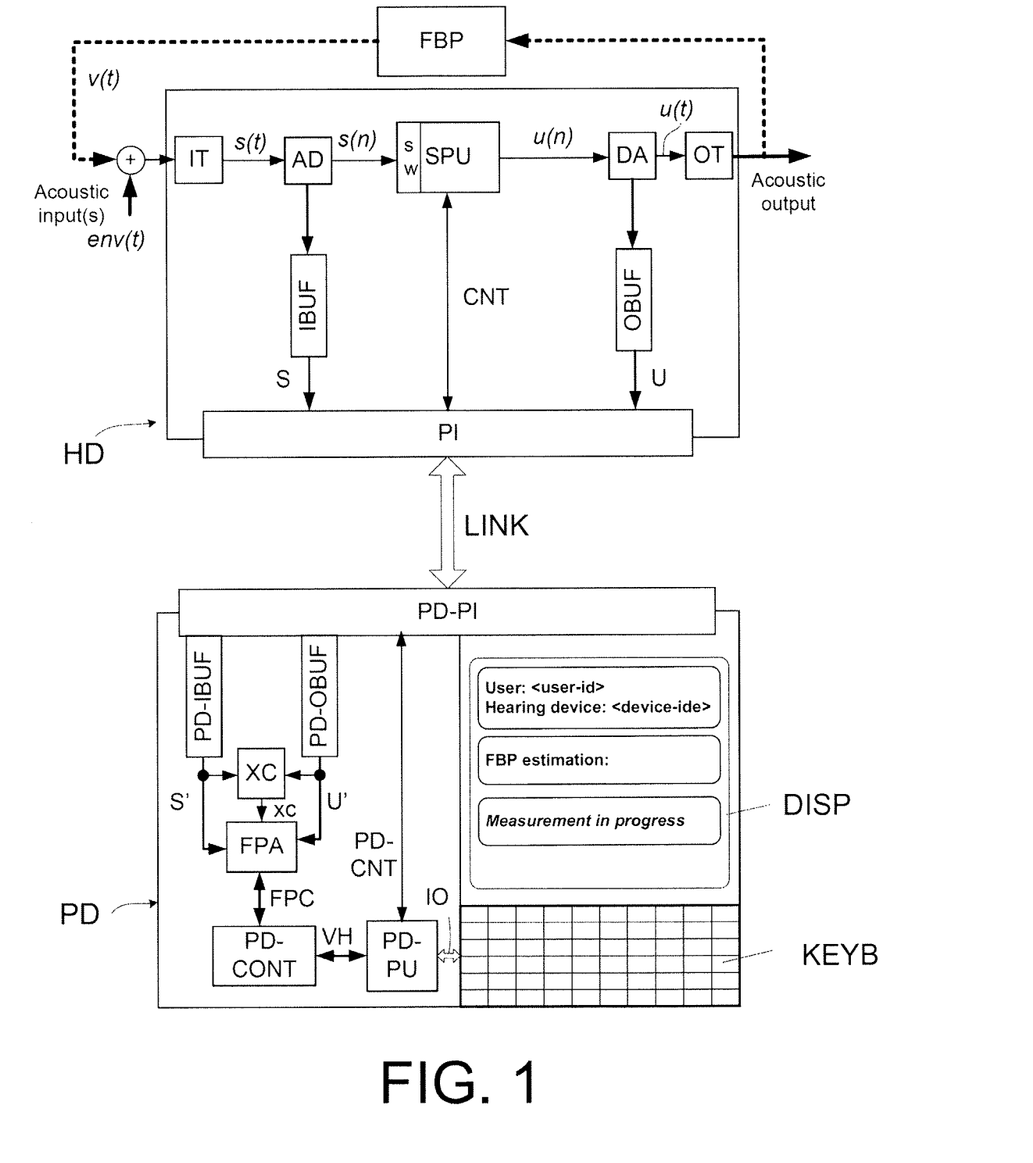
FIG. 1 shows a first embodiment of a hearing system according to the present disclosure, the hearing system comprising a hearing device operationally connected to a programming device running software for programming the hearing device, FIG. 2A schematically illustrates transmission of digital data samples on a sample by sample basis from a hearing device to a programming device of a hearing system according to the present disclosure, FIG. 2B schematically illustrates transmission of digital data samples on a frame by frame basis from a hearing device to a programming device of a hearing system according to the present disclosure.

To prepare for the off-line processing in the programming device, one needs to transmit the digital data samples to the programming device (see PI, PD-PI, LINK in FIG. 1). This is done because we want to include A/D and D/A converters of the hearing device in the feedback path estimation, since they are part of the feedback path. To transmit these two signals we need to introduce buffers (see IBUF and OBUF in FIG. 1) and then transmit the contents according to a predefined scheme (e.g. to empty the buffers every time they have been filled with new audio samples since the last transmission).

FIG. 1 shows a first embodiment of a hearing system according to the present disclosure, the hearing system comprising a hearing device operationally connected to a programming device running software for programming the hearing device.

FIG. 1 shows a hearing system for estimating an acoustic feedback path in a hearing device. The acoustic feedback path is indicated in FIG. 1 by block FBP (representing an acoustic transfer function, referred to as the (or a part of the) acoustic feedback path) and time varying signal v(t) (t being time). The hearing system comprises hearing device (HD) and programming device (PD). The hearing system comprises a feedback path analyzer (FPA) that is primarily located in the programming device (PD). The hearing device (HD) and the programming device (PD) each comprises a programming interface (PI PD-PI, e.g. implemented as a wired or wireless link, LINK in FIG. 1, 2A, 2B, 3, 4A) allowing the exchange of data between the devices. A programming interface is a typical feature of any hearing device that needs customization to a particular user's needs. The hearing system is configured to allow the streaming/transmitting of digital input/output signals to/from the hearing device to the programming device for ('offline') processing there. The hearing device thus only needs to provide the sample-based streaming and/or buffering/transmitting ability (in addition to normal functionality of the hearing device), while the feedback path estimation is done (based on the received input/output digital signals) using the programming device (e.g. a computer or SmartPhone). The programming device is e.g. configured to execute fitting software for the hearing device. This setup ensures that advanced and optimal estimations can be used without any limitation imposed by the (limited capacity) implementation of feedback estimation in hearing devices (due to typical size constraints of such devices).

The hearing device (HD) comprises an input transducer (IT) for converting an input sound to an (time varying, analogue) electric input signal s(t), where t represents time, and an output transducer (OT) for converting a processed electric signal u(t) to an output sound (Acoustic output in FIG. 1). The acoustic input signal (Acoustic input(s) in FIG. 1) comprises feedback signal v(t) constituted by (a part of) the Acoustic output signal propagated through the feedback path (FBP) and environment signal env(t) (e.g. a target signal and/or a noise signal). The hearing device further comprises an analogue to digital converter (AD) for converting an analogue electric signal s(t) to a digital electric signal s(n) comprising digital samples of the signal at discrete points in time n, and a digital to analogue converter (DA) for converting a digital electric signal u(n) comprising digital samples to an analogue electric signal u(t). A forward path is defined between the input transducer (IT) and the output transducer (OT). In addition to the analogue to digital converter (AD) and the digital to analogue converter (DA), the forward path further comprises a signal processing unit (SPU) for applying a level and/or frequency dependent gain to a signal of the forward path (here s(n)) and providing a processed output signal (here u(n)). The hearing device (HD) further comprises respective input (IBUF) and output (OBUF) buffers for storing corresponding input and output time segments of the electric input signal s(n) or a signal derived therefrom and of the processed output signal u(n) or a signal derived therefrom, respectively. In a specific feedback measurement mode, the system is configured to transmit the currently stored input and output time segments (represented by a number $N_{bf}$ of audio samples) of the respective signals (S, U) to the feedback path analyzer (FPA) of the programming device (PD) via the programming interface (PI, PD-PI, LINK). The forward path comprises a switch unit (sw) allowing a disconnection of the electric input signal s(n) from the signal processing unit (in a particular feedback mode of operation). The hearing system is configured to allow the switch unit (sw) and other features of the hearing device to be controlled from a user interface (e.g. of a programming device or a separate device) via signal CNT. In an embodiment, the output signal u(n) comprises or is constituted by a probe signal (e.g. generated in the hearing device (e.g. in the signal processing unit) or in the programming device). In an embodiment, the probe signal is used in a specific feedback measurement mode, where a feedback path is estimated in the programming device according to the present disclosure.

The programming device may comprise a memory or buffers (PD-IBUF and PD-OBUF) corresponding to input buffer (IBUF) and output buffer (OBUF), respectively, of the hearing device (HD) for storing corresponding received time segments of the input signal and output signal, respectively. Alternatively, the programming device is configured to continuously analyze the received data from the input and output buffers of the hearing device (HD) on a sample by sample basis, thereby keeping further delay at a minimum. The programming device comprises further the feedback path analyzer (FPA), which—in a specific feedback measurement mode—is configured to provide an estimate of the feedback path from the input of the digital to analogue converter (DA) to the output of the analogue to digital converter (AD) (including the acoustic path FBP) based on the input and output time segments. The programming device further comprises a feedback control unit (PD-CONT) for controlling the feedback path analyzer (FPA) (via signal FPC). In the embodiment of FIG. 1, the programming device further comprises a cross-correlation estimator (XC) for estimating the cross-correlation between the electric input signal (S') or a signal derived therefrom and the processed output signal (U') or a signal derived therefrom. The signals S' and U' at a given point in time comprise the contents of the buffers IBUF and OBUF, respectively, as received from the hearing device via the programming interface (PI, PD-PI, LINK). The output xc of the cross-correlation estimator (XC) is representative of the amount of cross-correlation between the input and output signals of the hearing device (at a given point in time) and thus (in certain situations) indicative of the (current) amount of feedback. Such information may be used to determine the type of feedback estimation algorithm used and/or an appropriate adaptation rate of the algorithm.

The feedback control unit (PD-CONT) receives (via signal FPC) a feedback estimate from the feedback path analyzer (FPA). The feedback estimate (signal VH) is fed to a processing unit (PD-PU) for possible further processing and/or transfer to the hearing device (via signal PD-CNT and the programming interface) and/or display via a user interface (comprising a display (DISP) and a keyboard (KEYB), the keyboard possibly integrated with the display). The user interface may e.g. be used to control the hearing device and to initiate a feedback measurement. The user interface may further be used to indicate a current mode of operation or status of an ongoing activity. The exemplary display (DISP) screen of FIG. 1 indicates that a feedback path measurement is in progress for a particular user (<user-id>) and a particular hearing device (<device-id>).

In an embodiment, the hearing system further comprises a noise detector for detecting a current noise level around the hearing device. The current noise level may be used to choose a type of algorithm to be used in the feedback estimation and/or an estimation time.

Figure 2A:
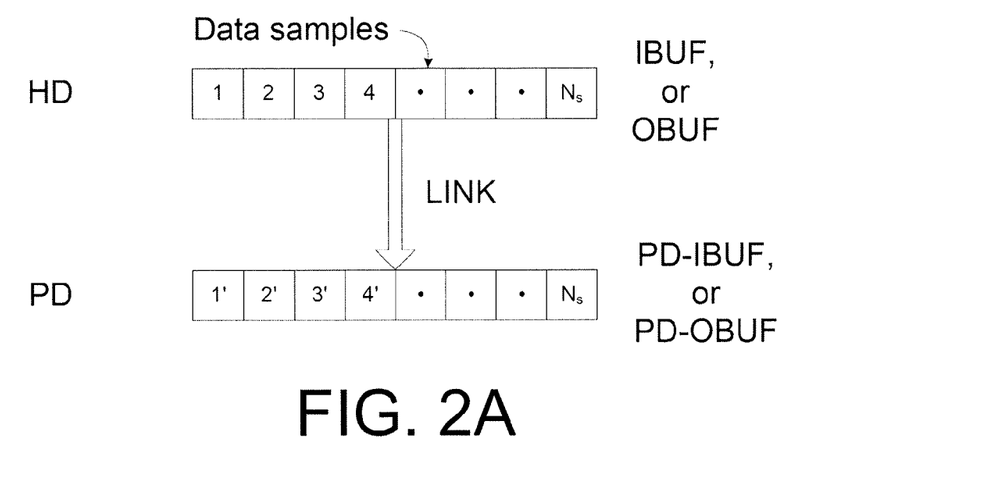
Figure 2B:
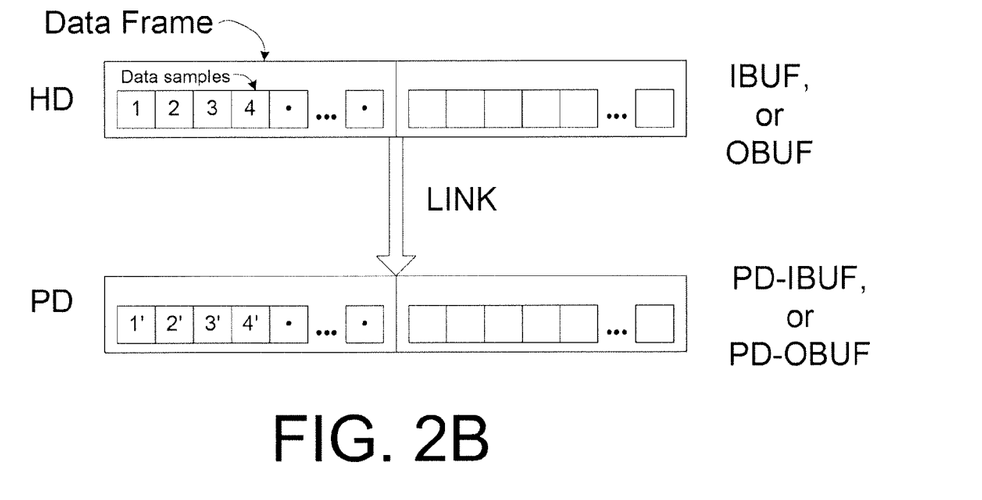

FIGS. 2A and 2B show illustrates transmission of digital data samples (Data samples) from a hearing device (HD) to a programming device (PD) of a hearing system according to the present disclosure. FIGS. 2A and 2B show two different schemes of data transmission suitable for the present application. Both may represent the contents of the input buffer (IBUF) or the output buffer (OBUF) in the hearing device (HD) and its transfer to a memory or corresponding buffers (PD-IBUF or PD-OBUF, respectively) of the programming device (PD) via a wired or wireless link (LINK).

FIG. 2A shows a data transmission scheme, wherein data are transmitted sample by sample. Data samples 1, 2, 3, 4, . . . , $N_{bf}$ are transmitted one by one from the hearing device to the programming device (data samples 1', 2', 3', 4', . . . , $N'_{bf}$). Each data sample represents the value of the acoustic signal at a time $t_n$ by a predefined number $N_s$ of bits, $N_s$ being e.g. in the range from 1 to 16 bits. A data sample has a length in time of $1/f_s$, e.g. 50 μs, for $f_s$=20 kHz, where fs is the sampling frequency of the analogue to digital converter. The number of samples ($N_{bf}$, $N'_{bf}$) per buffer may be held relatively small in the case of sample by sample transmission compared to a frame based transmission as illustrated in FIG. 2B.

FIG. 2B shows another data transmission scheme where several data samples are grouped into a data frame and then the entire data frame (Data Frame) is transmitted. This scheme is generally more efficient in the transmission but it requires (gives rise to) a larger (frame) delay.

Corresponding data samples of the data streams of the input and output signals are stored in the input and output buffers with a (deterministic) delay. The delay may be determined in advance and ease the further processing of the buffer contents in the programming device to determine an estimate of the current feedback path.

Figure 3:
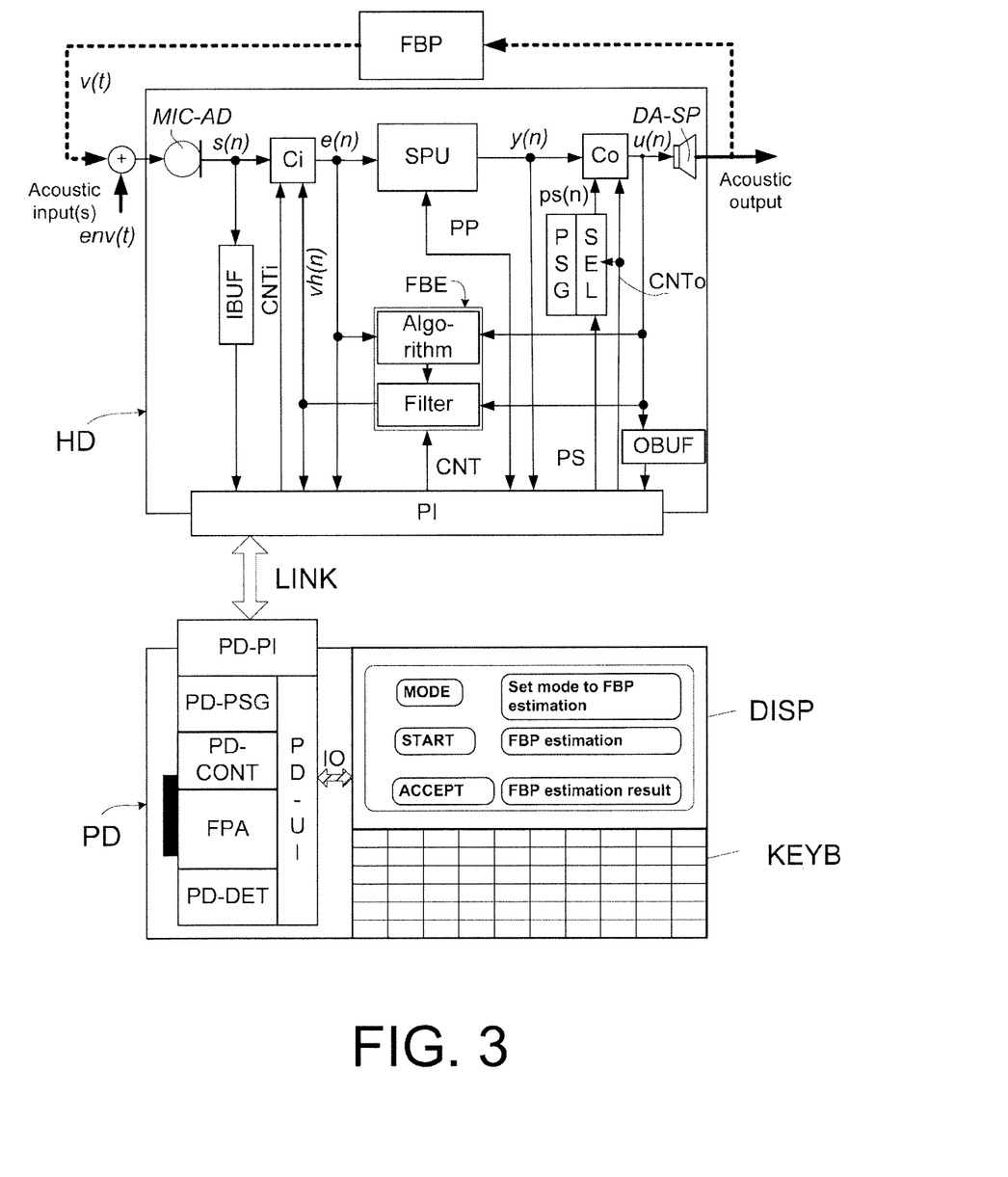
FIG. 3 shows a second embodiment of a hearing system according to the present disclosure.

FIG. 3 shows a second embodiment of a hearing system according to the present disclosure.

The prior art (online) method of estimating the feedback path is probably more straightforward/obvious to use in hearing aids, because the adaptive feedback cancellation system, which is already in all modern hearing aids, can be used to estimate the feedback path. In this way, it is in principle "free" in the sense that no new implementations are necessary to conduct the feedback path measurement.

However, the offline processing (performed in the programming device) provides the option to have different estimation methods than the one that is implemented in hearing aid. This is indicated in FIG. 3 by the shadowed outline of the feedback path analyzer unit (FPA). With the data access directly in a programming device/computer, we can estimate the feedback path using different methods (either one of them or all of them), and this can be done more quickly than the current online estimation, because we don't need to estimate the feedback path using the adaptive feedback cancellation system implemented in hearing aids.

One criterion for selecting which offline processing method could be based on (or influenced by) the inputs from one or more detectors, e.g. an estimate of the background noise level. Preferably, the hearing device and/or the programming device comprises a detector or estimator of the current noise level (cf. detector unit PD-DET in the programming device PD of FIG. 3). With a low background noise level, one could, e.g., apply the system identification method using a perfect sequence, which provides the shortest estimation time (cf. e.g. our co-pending European patent application no. EP14187424.8 with the title 'Feedback estimation based on deterministic sequences' filed on 2 Oct. 2014). On the other hand, with a relatively high background noise, one can use the sine sweep method or the deterministic method with matrix inversion, which are more robust against noisy background but takes longer time for the processing (or any other appropriate method).

In an embodiment, the hearing system is configured to use more than one algorithm to determine the final feedback path estimation. Having results from different algorithms, the measurement quality can be determined by analyzing the differences between the obtained results. Furthermore, the obtained results can be used to determine one final result, e.g., by averaging or discarding some of the results. A re-measurement can also be performed based on the analysis.

The embodiment of a hearing system illustrated in FIG. 3 comprises the same basic functional units as the one shown in and described in connection with FIG. 1.

The hearing device (HD) of FIG. 3 comprises a combined microphone and AD-converter unit (MIC-AD) providing digital electric signal s(n) comprising digital samples of the input signal (v(t)+env(t)) at discrete points in time n,.

Only one microphone is shown, but a multitude of input transducers (e.g. microphones) may be used, e.g. to implement a directional system and/or a multi-microphone noise reduction system. The digital electric signal s(n) is fed to the input buffer (IBUF) for transmission to the programming device via programming interface (PI) and communication link (LINK). The forward path of the hearing device further comprises input and output combination units Ci and Co, respectively. The combination units (e.g. sum or subtraction units (or alternatively multiplication units) or more generally mixing units) allowing a controlled combination or selection of inputs signals to the combination units. The input combination unit Ci is a generalization of switch sw described in connection with signal processing unit (SPU) of the embodiment of FIG. 1. The DA converter and output transducer OT of FIG. 1 is in FIG. 3 exemplified by combined DA and speaker unit DA-SP. The hearing device (HD) of FIG. 3 further comprises an onboard feedback estimation unit (FBE) for estimating a feedback from the input of the DA-SP unit (signal u(n)) to the output of the combination unit Ci (signal e(n)). The onboard feedback estimation unit (FBE) comprise a variable filter part (Filter) for filtering the output signal (u(n) and providing an estimate of the feedback path (signal vh(n)) under normal operation of the hearing device (where the programming device is NOT connected to the hearing device). The filter coefficients of the variable filter part (Filter) are determined by an adaptive algorithm (Algorithm part of the FBE unit) by minimizing the feedback corrected input signal (signal e(n)) considering the current output signal u(n). The hearing device (HD) of FIG. 3 further comprises an onboard probe signal generator (PSG) for generating a probe signal, e.g. for use in connection with feedback estimation, either performed by the onboard feedback estimation unit FBE or the feedback path analyzer (FPA) of the programming device (PD). The hearing device (HD) of FIG. 3 further comprises a selection unit (SEL) operationally connected to the onboard probe signal generator (PSG) of the hearing device (HD) and to signal PS from the programming device (PD), which alternatively may provide a probe signal from the probe signal generator (PD-PSG) of the programming device. The resulting probe signal ps(n) (output of selection unit (SEL)) at a given time (n) is controllable from the programming device via the programming interface and signal CNTo. Various functional units (e.g. Ci, SPU, FBE, and SEL, Co) of the hearing device are in general controllable from the user interface of the programming device via signals (CNTi, PP, CNT, and CNTo, respectively) exchanged via the programming interface (PI, PD-PI) and the communication link (LINK). Likewise, signals of interest in the hearing device (e.g. signals s(n), e(n), y(n) (output of signal processing unit SPU), and u(n) of the forward path) and feedback estimate vh(n) of the onboard feedback estimation unit (FBE) are made available in the programming device via the programming interface. The latter can e.g. be used as a comparison for the feedback path estimate(s) made by the feedback path analyzer (FPA) of the programming device (PD).

In addition to the functional units shown discussed in connection with FIG. 1, the programming device (PD) of FIG. 3 further comprises configurable probe signal generator PD-PSG for generating a probe signal for use in a feedback path measurement of the feedback path analyzer (FPA). Further, the feedback path analyzer unit (FPA) of FIG. 3 is configurable to allow the selection of feedback estimation algorithm from a multitude of algorithms (as indicated by the shadowed outline of the FPA unit). The programming device (PD) of FIG. 3 further comprises a detector unit (PD-DET) comprising one or more detectors, e.g. a correlation detector (cf. unit XC in FIG. 1) or a noise level detector, etc., for providing an indicator of one or more parameters relevant for controlling feedback path analyzer unit (FPA), e.g. a choice of feedback estimation algorithm. The interface to the user interface comprising display (DISP) and keyboard (KEYB) allowing exchange of data and commands is indicated by double (hatched) arrow denoted 10. The exemplary display (DISP) screen of FIG. 3 shows a situation where a user (e.g. an audiologist or the user himself) can select a feedback path estimation MODE, START a feedback path measurement and ACCEPT (or reject) the result of the feedback path measurement. If the result is accepted, the feedback path estimate is transferred to the hearing device, e.g. to the signal processing unit (via the programming interface, signal PP in the hearing device). Such improved feedback path measurement may e.g. be used in determining a maximum allowable gain (e.g. dependent on frequency bands) in a given acoustic situation, cf. e.g. WO2008151970A1.

Figure 4A:
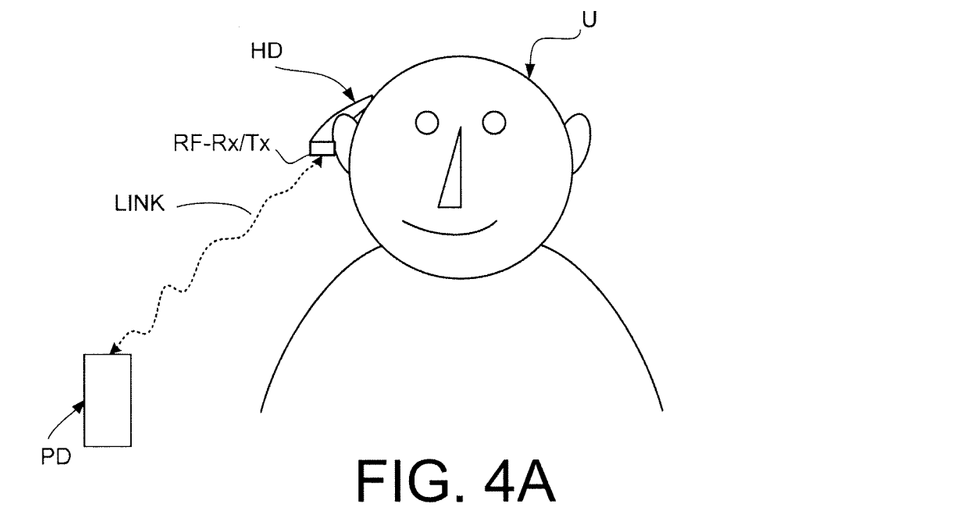
FIG. 4A shows a use case with a user wearing a hearing device of a third embodiment of a hearing system according to the present disclosure, wherein the programming device comprises a handheld user interface.
Figure 4B:
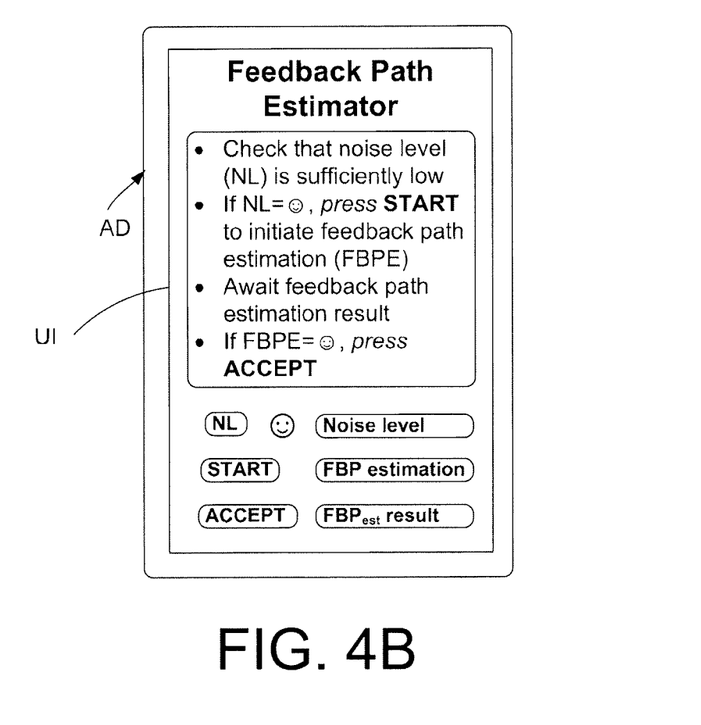
FIG. 4B shows an embodiment of the handheld user interface.

FIGS. 4A and 4B illustrate a third embodiment of a hearing system according to the present disclosure, wherein the programming device comprises a handheld user interface (cf. FIG. 4B). In an embodiment, the user interface of the programming device (PD) is implemented in a handheld device (optionally separate from the rest of the programming device but in communication therewith). The interface may e.g. form part of a remote control of the hearing system, e.g. implemented in a SmartPhone. Alternatively, the programming device may be implemented in a portable device together with the user interface. FIG. 4A illustrates the hearing system in use, the system comprising a portable programming device (PD) and a hearing device (HD) mounted at an ear of a user (U). A wireless link (LINK) can be established between the programming device (PD) and the hearing device (HD, cf. transceiver RF-Rx/Tx circuitry indicated in the hearing device). The link is e.g. based on a near field communication technology (e.g. inductive communication) or a far field communication technology (e.g. based on Bluetooth or similar standardized or proprietary technology). FIG. 4B shows the programming device, and illustrates in particular an example of the user interface (UI) implemented in the programming device (PD). The user interface (UI) comprises a display (e.g. a touch sensitive display) displaying a screen of a 'Feedback Path Estimator' mode. The screen comprises a first enclosed area (just below the title of the mode) giving instructions to user of the hearing system. The exemplary instructions are:

Check that noise level (NL) is sufficiently low.
If NL=☺, press START to initiate feedback path estimation (FBPE).
Await feedback path estimation result.
If FBPE=☺, press ACCEPT.

Below the exemplary instructions, activation elements (left) and corresponding explanation are given regarding:

NL ☺ Noise level (activation initiates a noise level measurements; acceptable and inacceptable noise levels are indicated by ☺ and ☹, respectively).
START FBP estimation (an estimation of the feedback path using a perfect or almost perfect sequence or sweep sequence can be initiated (if the noise level is acceptable)
ACCEPT FBP$_{est}$ result (if the estimate of the feedback path is acceptable (e.g. within certain predefined limits), it is accepted and transferred to the hearing device, e.g. to a signal processing unit of the hearing device, for possible use in the processing of a signal of the forward path).

Thus a revised feedback path estimation may be initiated via the user interface, e.g. by an audiologist during fitting or by a user after power-on, where a hearing device is re-mounted at an ear of a user (and maybe not optimally placed with respect to feedback). The latter is particularly of interest, if the programming device (or at least the present feedback path measurement) is implemented in a portable device, e.g. as an APP of a SmartPhone or similar device.

In conclusion, embodiments of the disclosure may be advantageous, because:

1. The offline estimation is independent of any implemented feedback cancellation system in the hearing device. By using a programming computer, the most optimal estimation method given the measurement environment, can be chosen.

2. The programming computer (e.g. a stationary or laptop PC) is typically more computationally powerful than a hearing device, and thus capable of performing more advanced estimations more quickly.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

EP14187424.8 (OTICON) Filed 2 Oct. 2014
WO2008151970A1 (OTICON) 18 Dec. 2008

The invention claimed is:
1. A hearing system comprising
a programming device for programming a hearing device, the programming device comprising
a feedback path analyzer for providing an estimate of a feedback path from an output transducer to an input transducer of the hearing device,
a programming interface allowing an exchange of data between the programming device and the hearing device, and wherein
the programming device — in a specific feedback measurement mode — is configured to receive correspond- ing input and output time segments of an electric input signal or a signal derived therefrom and of a processed output signal or a signal derived therefrom, respectively, of the hearing device, via said programming interface, and wherein the feedback path analyzer in said specific feedback measurement mode - is configured to determine said estimate of the feedback path of the hearing device based on said input and output time segments.

2. A hearing system according to claim 1 wherein the programming device comprises antenna and transceiver circuitry for wirelessly receiving a direct electric input signal from another device to implement said programming interface.

3. A hearing system according to claim 1 wherein said input and output time segments of the respective signals are received sample by sample from the hearing device by the programming device.

4. A hearing system according to claim 1 wherein the programming device is configured to continuously analyze the received data from the hearing device on a sample by sample basis.

5. A hearing system according to claim 1 comprising respective input and output buffers for storing said corresponding input and output time segments, respectively.

6. A hearing system according to claim 5, wherein the input and output buffers are configured to store more than 50 audio samples.

7. A hearing system according to claim 1 wherein the feedback path analyzer is configured to apply an LMS-type algorithm for providing an estimate of the feedback path.

8. A hearing system according to claim 1 comprising a number of different types algorithms, selectable for use by the feedback path analyzer to provide an estimate of the feedback path.

9. A hearing system according to claim 8 configured to automatically select an appropriate of said number of different types of algorithms based on a predetermined criterion.

10. A hearing system according to claim 1 comprising a feedback control unit for controlling the feedback path analyzer.

11. A hearing system according to claim 1 wherein the programming device comprises a configurable probe signal generator for generating a probe signal for use in a feedback path measurement of the feedback path analyzer.

12. A hearing system according to claim 1 wherein the programming device comprises a detector unit comprising one or more detectors for providing an indicator of one or more parameters relevant for controlling the feedback path analyzer unit.

13. A hearing system according to claim 5 wherein the programming device further comprises a cross-correlation estimator for estimating a cross-correlation between the electric input signal or a signal derived therefrom and the processed output signal or a signal derived therefrom, based on the contents of the input and output buffers, respectively, as received from the hearing device via the programming interface.

14. A hearing system according to claim 1 wherein the programming device comprises a noise level detector for detecting a current noise level.

15. A hearing system according to claim 14 wherein the programming device is configured to use the current noise level to choose a type of algorithm to be used in the feedback estimation and/or an estimation time.

16. A hearing system according to claim 1 configured to use more than one algorithm to determine a final feedback path estimation.

17. A hearing system according to claim 1 comprising a user interface allowing a user to initiate an estimation of the feedback path based on said input and output time segments.

18. A hearing system according to claim 17 wherein the user interface is configured to allow a user to accept the estimation of the feedback path so that the result is transferred to the hearing device.

19. A hearing system according to claim 17 wherein the user interface is implemented in a portable device.

20. A hearing system according to claim 17 wherein the programming device is implemented in a portable device together with the user interface.

21. A hearing system according to claim 19, wherein the user interface is implemented as an APP of a remote control, a smartphone or similar device.

* * * * *